(12) United States Patent
Rogers (10) Patent No.: US 11,615,477 B2
(45) Date of Patent: *Mar. 28, 2023

(54) METHODS AND SYSTEMS FOR PROPERTY INSURANCE BIDDING

(71) Applicant: Christopher Rogers, McMinnville, OR (US)

(72) Inventor: Christopher Rogers, McMinnville, OR (US)

(73) Assignee: Christopher Rogers, McMinnviller, OR (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/837,848

(22) Filed: Apr. 1, 2020

(65) Prior Publication Data

US 2020/0226693 A1 Jul. 16, 2020

Related U.S. Application Data

(63) Continuation of application No. 14/640,229, filed on Mar. 6, 2015, now Pat. No. 10,643,284.

(51) Int. Cl.
*G06Q 40/08* (2012.01)
(52) U.S. Cl.
CPC .................... *G06Q 40/08* (2013.01)
(58) Field of Classification Search
CPC .................................................. G06Q 40/08
See application file for complete search history.

(56) References Cited

U.S. PATENT DOCUMENTS

| 6,594,635 | B1 * | 7/2003 | Erlanger ................ G06Q 40/06 701/1 |
| 9,721,264 | B2 * | 8/2017 | Labrie ..................... G06F 30/13 |
| 9,830,328 | B2 * | 11/2017 | Faith .................. G06Q 30/0631 |
| 10,163,162 | B1 * | 12/2018 | Devereaux ............. G06Q 40/12 |
| 2002/0065758 | A1 * | 5/2002 | Henley .................. G06Q 40/08 705/37 |

(Continued)

OTHER PUBLICATIONS

Construction Risk Control Techniques (Year: 2009).*

(Continued)

*Primary Examiner* — Bruce I Ebersman
(74) *Attorney, Agent, or Firm* — Miller IP Law (57) ABSTRACT

The present disclosure is directed to methods for providing insurance brokerage services for both a property owner and potential insurers. The methods provide for virtual websites and related mobile applications for estimating the value of a property based on current reconstruction costs. The methods also provide for aiding a property owner in procuring an insurer by compiling property valuation information in a format that is submitted to potential insurers to bid upon. The methods further provide for helping property owners manage changes to property value and updating insurance policy based on valuation changes to reconstruction costs as well as compiling information for reconstruction costs when damage does occur. Finally, disclosure provides for methods of maintaining important records for insurer, maintaining communications between insured and insurer, and providing emergency services related to the insured property in the time of emergencies related to the insured property.

18 Claims, 3 Drawing Sheets

(56) References Cited

U.S. PATENT DOCUMENTS

| | | | |
|---|---|---|---|
| 2002/0116163 A1* | 8/2002 | Loveland | G06F 16/20 703/13 |
| 2002/0116254 A1* | 8/2002 | Stein | G06Q 50/163 705/314 |
| 2003/0229580 A1 | 12/2003 | Gass et al. | |
| 2004/0153352 A1* | 8/2004 | Berns | G06Q 30/06 705/14.73 |
| 2004/0267577 A1* | 12/2004 | Nakai | G06Q 40/08 705/4 |
| 2006/0085322 A1* | 4/2006 | Crookshanks | G06Q 30/06 705/37 |
| 2006/0190310 A1 | 8/2006 | Guida et al. | |
| 2007/0087756 A1* | 4/2007 | Hoffberg | G06Q 10/06375 455/450 |
| 2007/0225863 A1* | 9/2007 | Gross | G06Q 50/08 700/266 |
| 2008/0126138 A1 | 5/2008 | Cherney et al. | |
| 2009/0177500 A1* | 7/2009 | Swahn | G06Q 40/08 705/4 |
| 2010/0042442 A1 | 2/2010 | Seitomer et al. | |
| 2010/0174564 A1* | 7/2010 | Stender | G06Q 10/10 709/206 |
| 2011/0320223 A1* | 12/2011 | Drennan, III | G06Q 40/08 707/E17.014 |
| 2012/0143630 A1* | 6/2012 | Hertenstein | G06Q 40/08 705/4 |
| 2012/0221476 A1* | 8/2012 | Candelario | G06Q 10/1053 705/321 |
| 2012/0278767 A1 | 11/2012 | Stibel et al. | |
| 2013/0132440 A1* | 5/2013 | Carlson | H04L 67/306 707/792 |
| 2013/0332341 A1 | 12/2013 | Papadimitriou | |
| 2015/0012304 A1 | 1/2015 | Rao | |
| 2015/0073834 A1* | 3/2015 | Gurenko | G06Q 40/08 705/4 |
| 2015/0178866 A1* | 6/2015 | Serio | G06Q 50/163 705/314 |

OTHER PUBLICATIONS

Analysis of engineering costs (Year: 1957).*
Learning and Trust in Auction Markets (Year: 2017).*
Improving the Efficiency of Blockchain Applications with Smart Contract based Cyber-insurance (Year: 2020).*
Integration and Optimization of Information Processes in the Insurance Sector IEEE 2021 (Year: 2021).*
Insurance 101 for the Safety Professional IEEE 2005 (Year: 2005).*
Check a home's insurance history by Kimberly Lankford, Jan. 30, 2006.

* cited by examiner

METHODS AND SYSTEMS FOR PROPERTY INSURANCE BIDDING

CROSS-REFERENCES

This application is a continuation of co-pending U.S. patent application Ser. No. 14/640,229 by Christopher Rogers entitled "Insurance Brokerage Services," the entirety of which is incorporated herein by reference.

BACKGROUND

The present disclosure relates generally to insurance brokerage services. In particular, the disclosed methods are directed to providing a way for insures to select the best insurer for their needs and provide the insurer up-to-date information regarding the owner's property, so that accurate insurance policy premium quotes may be prepared. The methods disclosed provide insurance-related services to both property owner and insurer.

People purchase insurance to protect themselves from potential future loss. Maintaining up-to-date and detailed information regarding one's property, real or personal, is important for policy holders when they need to make a claim for loss or damage to that property. Unfortunately, disagreements arise between policy holders and insurers as to what is owed to the policy holder or what the insurer's obligations are based on the value of the policy holder's property. Most policy holders, such as a homeowner, never experience losing their home and attempting to rebuild, so the relationship with their insurer remains distant and cordial. This relationship between policy holder and insurer is tested only in the face of extreme adversity. The aftermath of many recent disasters, such as Hurricane Katrina and the Colorado and California wildfires, reveals an alarming disconnect between the insurers and policy holders.

Traditional home-insurance policy holder insure relationships have not been ideal. Historically, through the 1980's, insurance companies wrote a large number of guaranteed replacement policies for homeowners. These policies represented the highest level of coverage and truly guaranteed full replacement on losses experienced by policy holders. In the 1990's, devastating natural disasters prompted numerous claims against said full rep replacement policies from homeowners (policy holders) who had just experienced a total loss on their homes. These mass, simultaneous claims bankrupted a number of smaller insurers and significantly impacted the profits of the major providers.

Insurers, learning from the aftermath of the 1990's natural disasters, realized that providing full replacement policies was unprofitable and not sustainable. Currently, most insurance companies do not offer true full replacement policies comparable to the pre-1990's full replacement policies. Standard policies today provide far less coverage compared to what would be considered full replacement coverage, while charging considerably greater premiums for top-tier policies.

Unfortunately, policy holders have been slow to adjust to changes in the degree of coverage and the responsibilities placed upon them to maintain the information contained within their policies. A far too common occurrence is when policy holders choose to trust their insurance agent and sign up for a policy without fully understanding for the terms. Policy holders often assumed that a top-tier replacement policy guarantees full replacement value for losses when disaster strikes: In reality, these policies cover only the value of the home at the time it is insured and, in some instances, include additional terms to cover reconstruction costs.

Furthermore, many policy holders assume their insurance agent will keep them update on any additional information required to keep their policy current, when in fact, this often does not occur. Thus, although unknown to the policy holder, insurers will not always check in with them periodically to see if there should be any changes to their existing policy. It is then an unspoken rule that the policy holder must notify the insurer if there are any changes to his property that might require the insurance policy to be adjusted. For example, it is often on the policy holder to inform his insurance when the policy holder replaces the existing carpet or upgrades his kitchen, thereby changing the value of his property.

Becoming obsolete is one major problem with home insurance policies. An insurance policy can become obsolete due to a range of factors. For one thing, traditional market forces alone can cause the value of a property to appreciate over time. Another factor that comes into play is when price of construction materials change due to over or short supply of such materials. When combined with changes in building codes and regulations, inflation in the price of labor, and any significant updates to the home, it becomes apparent that a policy based on a fixed valuation from potentially many years back could easily underestimate the cost of reconstruction at today's rates by tens of thousands of dollars or more.

Thus, there exists a need for a service that provides "transparency" for both the policy holder as well as the insurer. This service would not only aid policy holders with not only choosing an appropriate policy but also helping the policy holder maintain up-to-date specifications about their property. Furthermore, insurers would benefit from having an easy set of parameters to build an accurate policy quote as well as having an accurate assessment of the value of their policy holder's property, thus giving rise to fewer disputes over claims filed.

A number of prior art patents disclose methods related to insurance offers and services, but none offer the comprehensive services detailed in the description below. The following patents are representative and are incorporated herein by reference for all purposes: US 2010/0042440 to Seitomer published on Feb. 18, 2010 ("Seitomer"); US 2008/0126138 to Cherney published on May 29, 2008 ("Cherney"); and US 2015/0012304 to Rao published on Jan. 8, 2015 ("Rao").

Seitomer discloses applications and methods related to estimating the value of a home. Seitomer applies heuristic research methodology to determine the values of different characteristics of a home that is then used to estimate the value of a home. The methodology includes researching different types of home renovations and home furnishings based on quality and quantity. A user enters data regarding their property and software application accesses the value for home reconstruction based on the user's entries. Also, the software generates initial insurance premiums based on the data generated from the home value estimator. While the methods disclosed in Seitomer would be able to estimate the cost of reconstructing a home, when the estimate relies on a user's own familiarity with the components that go into constructing their home, there may inaccuracies in determining the actual value of reconstruction.

The Cherney application discloses a system and method for presenting insurance otters and is specifically directed to vehicular insurance. Cherney's system stores user information and a plurality of insurance policy offers. The Cherney system provides for a user interface where a user can input information about the item they wish to insure, and the owner's personal information. The system generates an insurance quote used on the information provided and the repository of policies in their system. The Cherney application does not relate easily to home insurance. For example, it would be much more challenging to build an insurance quote for real property based on what a user could input. Further, unlike vehicles, where the value can he roughly estimated from the make, model and year, the value of a home cannot be so easily estimated. The Rao application discloses methods for managing insurance policy events. One method includes steps beginning with (a) a broker receiving an electronic communication from an insurance provider of an event elated to a policy of a consumer serviced by the insurance provider and (b) responding to the notice, automatically determining whether the event meets at least one event criteria monitored by the broker. This method further includes steps of the program initiating an action related to the event once the program determines that at least one event criterion monitored by the broker has been met. While the methods described by Rao would help a broker better service his customers does not provide bid preparation services for both finding an insurer or contractor nor does it provide a repository for relevant information regarding a property or a platform on which policy holders and insurers or contractors may communicate.

SUMMARY

The present disclosure is directed to methods for providing insurance brokerage services for both a property owner and potential insurers. The methods provide for virtual websites and related mobile applications for estimating the value of a property based on current reconstruction costs. The methods also provide for aiding a property owner in procuring an insurer by compiling property valuation information in a format that is submitted to potential insurers to bid upon. The methods further provide for helping property owners manage changes to property value and updating insurance policy based on valuation changes to reconstruction costs as well as compiling information for reconstruction costs when damage does occur. Finally, disclosure provides for methods of maintaining important records for insurer, maintaining communications between insured and insurer, and providing emergency services related to the insured property in the time of emergencies related to the insured property.

DETAILED DESCRIPTION

The present invention is generally directed to method of providing intermediary services between an insurance policy seekers (herein after termed "policy holder") and a pool of potential insurers. On the homeowner/policy holder side, this method provides clarity regarding what each policy provides and associated premiums. On the side of the insurer, this method provides a way of providing their customers with accurate assessment of their property valuation and thus leading to less spurious claims.

The scope and spirit of the present invention, including the disclosed services and methods, will become better understood through a review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, whenever possible, examples are provided to aid the reader in understanding the services and methods disclosed. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The system 100 includes, but is not limited to, a property owner or a policy holder 110, a virtual agency 120, proprietary software 1.30, and insurance companies 140. Policy holders 110, before they become policy holders 110, are property owners are parties seeking the best insurance policy to protect their property, which includes the most coverage they can obtain with reasonable premiums. From the get-go, property owner is tasked with finding, researching, and selecting an insurance provider, to providing the selected insurance company with the necessary information related to the future coverage of his property. Then, once the property owner is a policy holder 110, the policy holder makes a claim for coverage when damages or loss occurs. A virtual agency 120 will help homeowners, or more precisely, future policy holders 110 make educated decisions about which policy to choose and to make apparent what exactly they are covered for and the degree of coverage.

Figure 1:
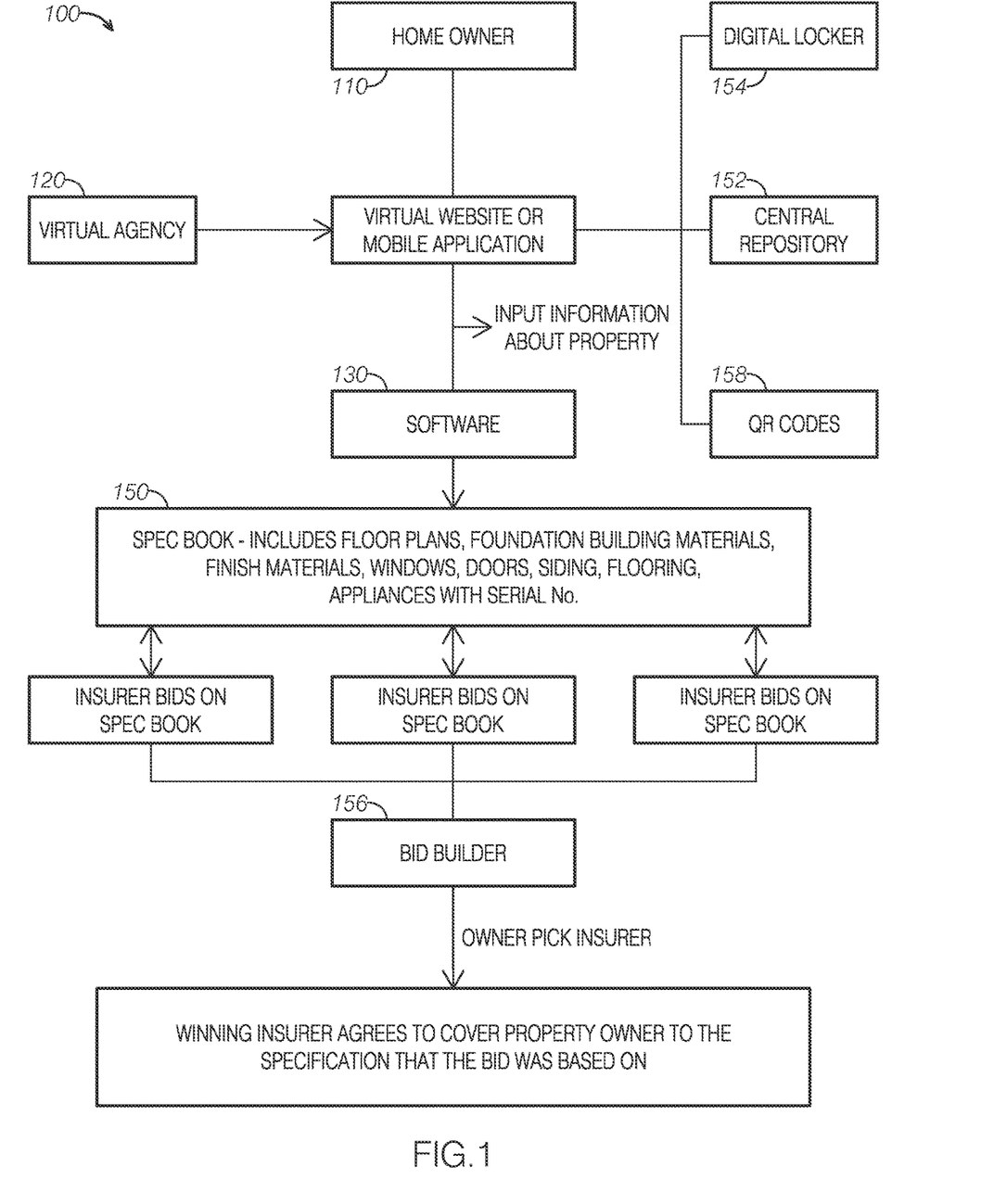
FIG. 1 is a flowchart that shows how the insurance brokering method works from a homeowner's standpoint.

Turning to FIG. 1, when future policy holder 110 engages the virtual agency 120, virtual agency will aid future policy holder 110 in creating a specbook (short for specification book) 150. Virtual agency 120 will enter detailed information regarding all the elements that go into constructing a home with information provided by owner/policy holder 110 and information obtained from reliable sources, input the information into proprietary software 130 to generate specbook 150 for a particular property. Specbook 150 will describe in detail all the elements that go into construction the property. Specbook 150 will integrate the property's blueprints, materials used, fixtures used, spacing of studs, and so forth, and create a living, digital document that can be updated when the property is updated. Specbook 150 can also include details and photos of valuables that potential policy holder 110 wishes to insure. In the event that a property is destroyed, an exact replica of the property can be constructed based on the information contained within specbook 150.

Accompanying specbook 150 is a new certification that be made available to home inspectors. Certified inspectors typically create specbooks from new homes when construction of the home has been completed and a final inspection performed and virtual agency 120 will work with inspectors to generate specbook 150 for the policy holder 110. Proprietary 130 can also create specbook 150 retroactively for properties that are not newly built. Furthermore, when improvements or additions are made to a property having specbook 150, virtual agency 120 will update the new information in specbook 150, where the information will be validated by a certified inspector.

As mentioned above, proprietary software 130 can calculate the exact costs associated with rebuilding a property based on current market prices for materials and labor. Proprietary software 130 will further retain historical data, so that users can track trends. Advanced functionality of proprietary software 130 will allow users to receive alerts based on valuation thresholds, such as when the price of a specific raw material were to increase by more than a specified percentage over a specific timeframe. Proprietary software 130 allows each client to set what the threshold limit will be.

Proprietary software 130 has benefits for insurers. Proprietary software 130 allows insurers to better manage the risks associated with insuring their customers. For reals property, prior to insuring the property, virtual agency 120 can aid potential insurers in providing more accurate coverage costs based on current material costs for reconstructing the property. Insurers using system 100 will be able to track the true costs of replacing or reconstruction. Having an accurate account of the costs associated with insuring a particular property based on the materials and labor costs will allow insurers to set associated premiums accordingly.

Figure 2:
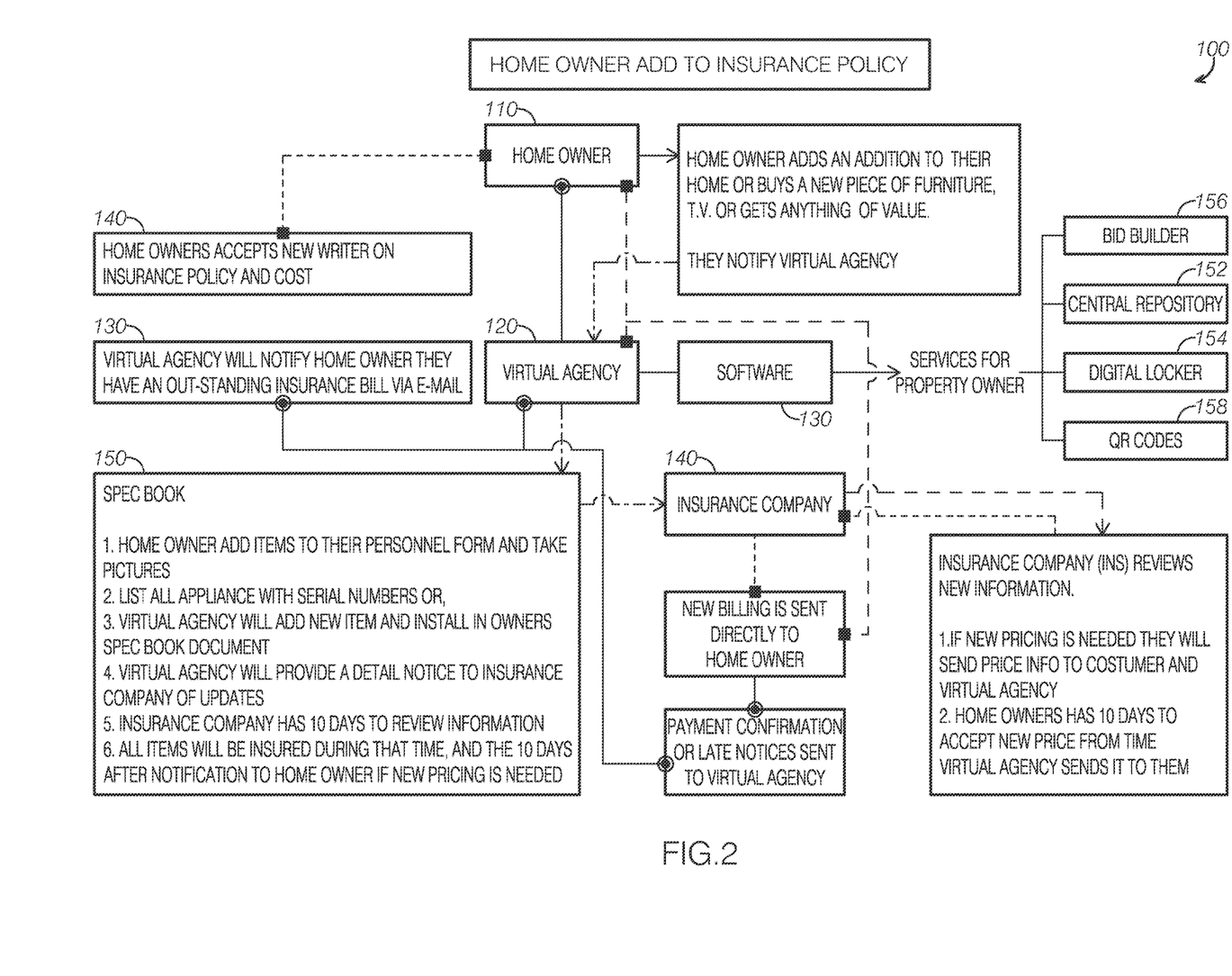
FIG. 2 is a second flowchart showing how a homeowner and the insurer would use the insurance brokerage services once the homeowner has accepted a policy.

Another aspect of this invention is a central repository 152 for all communications between the policy holder and the insurer. Central repository 152 provides an easily retrievable insurance-related information. Proprietary software 130 will provide an easy and intuitive way for both policy holders and insurers to access central repository 152 either on virtual agency 120's website or via virtual agency 120's mobile application. Thus the invention includes both a standard web interface as well as a mobile application. In addition to having access to specbook 150 and all communications, both policy holders and insurers that sign up for virtual agency 120's services will have a digital locker 154. Digital locker 154 is a virtual place for retaining copies of receipts and important document such as deeds, birth and wedding certificates. Policy holders can also upload pictures of possessions that are covered under their policy or policies.

Another aspect of the present disclosure is a bid builder 156. Bid builder 156 first provides a tool that will help customers (future policy holders) create a portfolio of information regarding the property or properties they want to insure. The customer is ultimately in control of this information and decides which insurer agent will receive the information. In an exemplary case, online website of virtual agency 120 will allow registered insurance agents to login onto their secure site. Once logged in potential insurers 140 can view a list of potential customers with a general description. Interested insurers 140 can inquire about making bids on portfolios shown; a request is sent to the corresponding potential policy holder 110 of the portfolio of interest. Potential policy holder 110 then decides which interested potential insurers 140 he will share digital access to specbook 150. Once received, potential insurers 140 can then craft their bids based on specbook 150 within a limited period of time. If multiple potential insurers 141, once these potential insurers have created bids for a particular portfolio, bid builder 156 will compile the multiple bids and notify potential policy holder 110 when the compile bids are ready for review. When potential policy holder 110 has reviewed and selected insurer 140, virtual agency 120 will digitize and be made accessible to policy holder 110 on virtual agency 120's website or mobile site. Futures changes to a particular policy will be noted and recorded.

Once a particular insurer 140 has won the bid to insure a particular property, virtual agency 120 will aid policy holder 110 in his relation with insurer 140. Virtual agency 120 will manage the premium costs for policy holder 110. Any new information from insurer 140 will also be sent through virtual agency 120. Information can include notices of non receipt of payment or any other changes to their policy. Other information may include when insurers need to adjust the price for particular coverage. In this latter case, once virtual agency 120 sends policy holder 110 of such a notice, policy holder 110 has a set amount of time (e.g. five to ten business days) to accept the new terms of the policy. In addition, virtual agency will 120 will aid policy holder 110 when policy holder 110 seeks to have additional items covered under his policy or wishes to update the coverage under his policy because be undergoing a remodel or addition to his property.

Yet another aspect of this invention relates to when damage has occurred to policy holder's 110 insured property and reconstruction is required. When damage occurs to property, policy holder 110 will notify virtual agency 120 and virtual agency 120 will generate a unique QR code 158 to the particular incident. Assigned QR code 158 will be placed in front of the property of interest. When reconstruction agencies and contractors come to look at the potential project and bid on the reconstruction job, they will go through virtual agency 120 much like how insurers 140 go through virtual agency 120 to bid on the initial policy holder 110's insurance policy. To start the process, registered contractors use virtual agency 120's mobile application to scan QR code 158 in front of the property. Policy holder 110 is then notified that a contractor is or multiple contractors are requesting information in order to generate a reconstruction bid. Like the insurance policy bidding process, if policy holder 110 approves, a contractor is or multiple contractors are given access through virtual agency 120's website or mobile site to relevant information, such as specbook 150, photos of the related damage to the insured property, and other related reports to prepare a bid. In other examples, the potential contractors may request through the virtual agency to have a physical inspection of the property of interest to better assess the damages.

Virtual agency 120 will also act as a liaison if any questions or disputes arise between policy holder 110 and insurer 140. Virtual agency 120 will provide both parties with records of communications between the parties. Virtual agency 120 will aid both parties determine what is covered and to what degree the coverage is.

Virtual agency 120 would also offer related services. One such services is providing customers with automatic forwarding email aliases and access to a phone conferencing line. Thus, all communications between policy holder 110, insurer 140, contractor, or other relevant outside party can be easily archived on virtual agency 120's system. For example, when homeowner Jon Smith signs up with the virtual agency, he will be granted an email address, such as, jon.smith@virtualagency.com. As part of the registration process, Jon would provide the virtual agency with his personal email address, so that messages to jon.smith@virtualagency.com will automatically forward to Jon's personal address. Likewise, when an insurance agent signs up with the virtual agency to provide bids to potential policy holders, he will also be granted an email address associated with the virtual agency. Then, when policy holders and insurers communicate, all related emails will be sent through virtual agency's system and will be archived and stored with the virtual agency, even though on the user end, they appear be communication through their personal or work mails. For in-person or over-the-phone communications, property owner and the insurer or contractor will dial a virtual agency's number and connect through the virtual agency's system, so an audio recording can be made of each conversation. Payments to the insurer and contractors are also performed through the virtual agency's website and records of such payment maintained for easy access later. All communications and transactions between a property owner and an insurer or contractor will be archived and made available to both parties through the virtual agency's web portal or mobile application.

Figure 3:
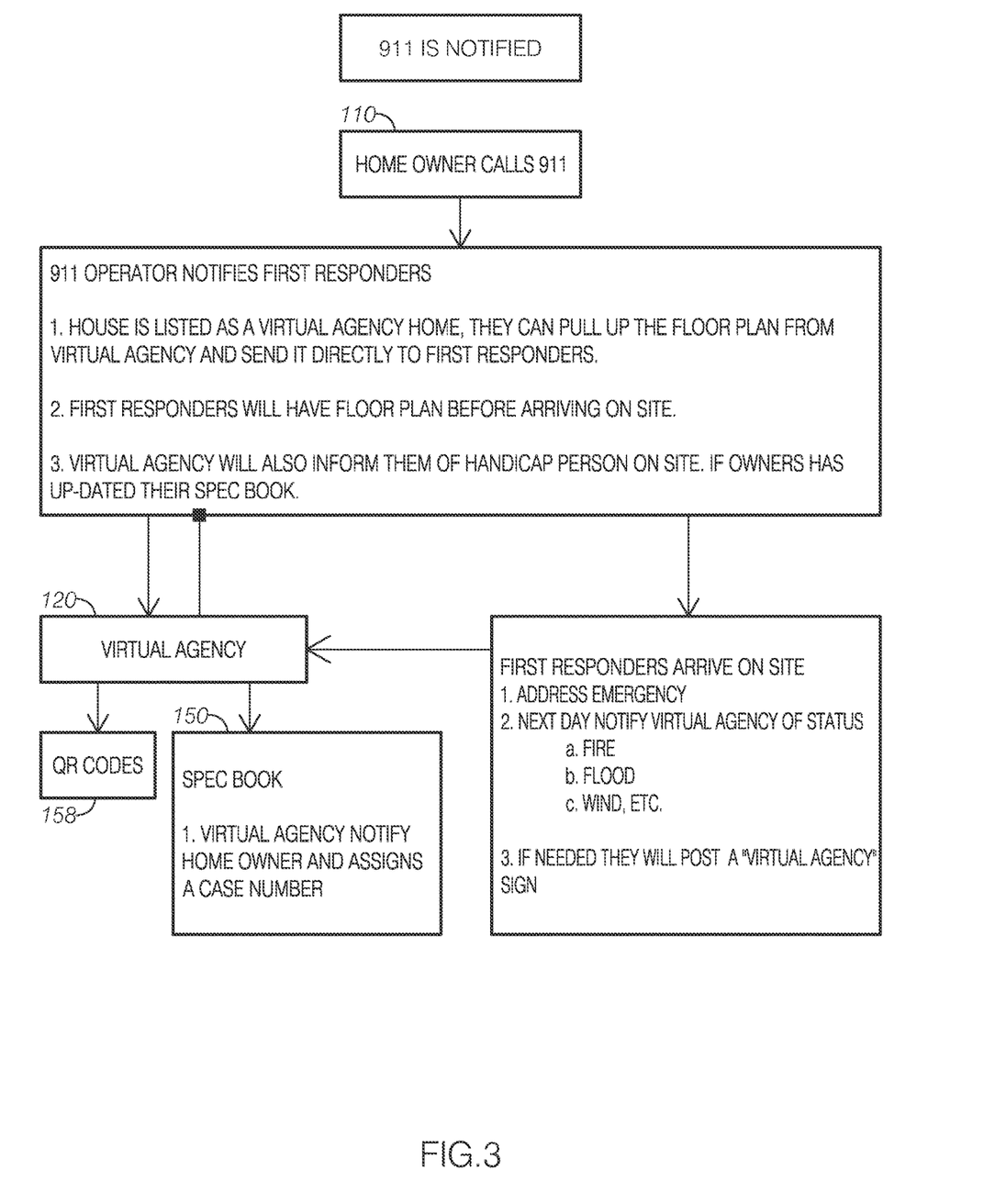
FIG. 3 is a third flowchart showing how the insurance brokerage service would be helpful in real-time emergencies.

Another service that virtual agency 120 can offer policy holders 110 is during the time of a crisis or emergency. Virtual agency 120 will create an emergency time function that give certified emergency crews access to any policy holder 110 registered with virtual agency 120 critical information such blueprints of a property for helping save and handle an emergency situation. A potential scenario would be that When a property owner notifies virtual agency that their house is on fire and they have just notified the fire department. Virtual agency can send the blueprints directly to the firemen en route to the property so they will have additional information about the property helping them better respond to the emergency. Even if no call is made to virtual agency, emergency responders can manually log in and check if there is any information on the reported property through the virtual agency's web or mobile site.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be clammed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system, comprising:
the data of a potential policy holder user device, stored on a server, communicatively coupled with a potential policy holder of a property insurance policy, wherein the property insurance policy is for a to-be-built structure;
the data of an insurer user device, stored on a server, accessible by a plurality of potential insurers;
a database storing specbook data, wherein the specbook data comprises:
an element that goes into construction of the to-be-built structure;
a photo of at least a portion of the to-be-built structure;
a description of the portion of the to-be-built structure; or
a server communicatively coupled to the potential policy holder user device's data, stored on a server, the insurer user device's data, stored on a server, and the database, wherein the server stores and executes instructions to:
receive information about a change or an addition to the to-be-built structure after an effective date of the to-be-built structure is insured by the selected insurer;
update the specbook with the information;
determine, prior to damage occurring to the to-be-built structure and after receiving the information, a change in a cost to rebuild the to-be-built structure based on the information;
in response to the change in the cost to rebuild the to-be-built structure, and prior to the damage occurring to the to-be-built structure, automatically update the selected insurance policy based on the change in the cost to rebuild the to-be-built structure;
receive requests from the plurality of potential insurers via the insurer user device to bid on insuring the to-be-built structure;
transmit the requests to the potential policy holder via the potential policy holder user device;
receive an approval from the potential policy holder via the potential policy holder user device for a subset of potential insurers to view the specbook data;
transmit the specbook data to the subset of potential insurers via the insurer user device;
receive a set of bids to insure the to-be-built structure from the subset of potential insurers via the insurer user device;
transmit the set of bids to the potential policy holder via the potential policy holder user device;
receive a selected bid from the potential policy holder via the potential policy holder user device, wherein:
the selected bid corresponds to a selected insurance policy;
the selected bid is selected by the policy holder from the set of bids; and
the selected bid was proposed by a selected insurer from the subset of potential insurers; and
transmit a confirmation of bid selection to the selected insurer via the insurer user device;
receive, via the server, a notification from the policy holder that damage has occurred to the property after the potential policy holder becomes the policy holder with the selected insurer;
generating, after the damage has occurred, a referential sequence comprising a physical or tangible media that is unique to the damage and the property, wherein the physical or tangible media is any combination of any numbering, letters, symbols, graphics, color arrangements, or codes; and in response to the referential sequence being generated, automatically transmitting a printable copy of the referential sequence to the first user device;

receiving, after the referential sequence is generated, and from a third user device, a request for information about the damage and the property, wherein:

the request is generated in response to the third user device scanning a physical copy of the referential sequence;

the third user device is used by a contractor to bid on repairs to the property;

transmitting the request to the policy holder via the second user device;

receiving a second approval from the policy holder via the second user device to release the information about the damage and the property to the contractor via the third user device; and in response to receiving the second approval, automatically transmitting the information about the damage and the property to the third user device.

2. The system of claim 1, wherein the specbook data or the element that goes into construction of the to-be-built structure comprise:

blueprints of the to-be-built structure;
material used for the to-be-built structure;
fixtures used for the to-be-built structure; or
spacing of studs of the to-be-built structure.

3. The system of claim 1, wherein the specbook data comprises information to construct an exact replica of the to-be-built structure in an event the to-be-built structure is destroyed.

4. The system of claim 1, further comprising the data from a home inspector user device, stored on a server, communicatively coupled to the server, wherein the server further stores and executes additional instructions to:

generate a home inspection certification based on the specbook data; and
transmit the home inspection certification to a home inspector via the home inspector user device.

5. The system of claim 1, further comprising the data from a home inspector user device communicatively coupled to the server, wherein the server further stores and executes additional instructions to receive the specbook data from a home inspector via the home inspector user device.

6. The system of claim 1 wherein the third user device is used by a contractor to request through a virtual agency to have a physical inspection of the damaged property.

7. The system of claim 1 wherein the virtual agency generates automatic email aliases for users.

8. The system of claim 7 wherein the virtual agency provides automatic email forwarding to users holding automatically generated email aliases.

9. The system of claim 1 wherein the virtual agency enables telephonic conferencing between users where users dial a virtual agency number and connect to the virtual agency system.

10. The system claim of 9 wherein the virtual agency system records the telephonic conferencing between users.

11. The system of claim 1 wherein the virtual agency handles payment by users.

12. A system, comprising:

the data from a potential policy holder user device, stored on server, communicatively coupled to a potential policy holder of a property insurance policy, wherein the property insurance policy is for a to-be-built structure;

the data from an insurer user device, stored on server, accessible by a plurality of potential insurers;

a database storing specbook data, wherein the specbook data comprises:

elements that go into construction of a property of the potential policy holder;
a photo of at least a portion of the to-be-built structure;
a description of the portion of the to-be-built structure; and a server communicatively coupled to the potential policy holder user device, the insurer user device, and the database, wherein the server stores and executes instructions to:

receive information about a change or an addition to the to-be-built structure after an effective date of the to-be-built structure is insured by the selected insurer;

update the specbook with the information;

determine, prior to damage occurring to the to-be-built structure and after receiving the information, a change in a cost to rebuild the to-be-built structure based on the information;

in response to the change in the cost to rebuild the to-be-built structure, and prior to the damage occurring to the to-be-built structure, automatically update the selected insurance policy based on the change in the cost to rebuild the to-be-built structure;

receive requests from the plurality of potential insurers via the insurer user device to bid on insuring the to-be-built structure;

transmit the request to the potential policy holder via the insuree user device;

transmit the requests to the potential policy holder via the potential policy holder user device;

transmit the specbook data to the potential insurer via the insurer user device;

receive an approval from the potential policy holder via the potential policy holder user device for a subset of potential insurers to view the specbook data;

receive a bid for the property insurance policy from the potential insurer via the insurer user device;

receive a set of bids to insure the to-be-built structure from the subset of potential insurers via the insurer user device;

transmit the set of bids to the potential policy holder via the potential policy holder user device;

receive a selected bid from the potential policy holder via the potential policy holder user device, wherein bid receipt comprises:

transmission of the specbook data to the subset of potential insurers via the second user device;
receipt of a set of bids from the subset of potential insurers via the second user device;
transmission of the set of bids to the potential policy holder via the first user device;
receipt of a selected bid from the potential policy holder via the first user device; and
transmission a confirmation of bid selection to a selected insurer via the second user device, wherein the potential policy holder becomes a policy holder with the selected insurer;

receive, via the server, a notification from the policy holder that damage has occurred to the property after the potential policy holder becomes the policy holder with the selected insurer;

generating, after the damage has occurred, a referential sequence comprising a physical or tangible media that is unique to the damage and the property, wherein
the physical or tangible media is any combination of any numbering, letters, symbols, graphics, color arrangements, or codes; and in response to the referential sequence being generated, automatically transmitting a printable copy of the referential sequence to the first user device;

receiving, after the referential sequence is generated, and from a third user device, a request for information about the damage and the property, wherein:

the request is generated in response to the third user device scanning a physical copy of the referential sequence;

the third user device is used by a contractor to bid on repairs to the property;

transmitting the request to the policy holder via the second user device;

receiving a second approval from the policy holder via the second user device to release the information about the damage and the property to the contractor via the third user device; and in response to receiving the second approval, automatically transmitting the information about the damage and the property to the third user device.

13. The system of claim 12, the database further storing:
cost data associated with rebuilding the property based on current market prices for materials and labor, wherein the cost data is based on the specbook data; or
historical data of trends in market prices for the materials and the labor.

14. The system of claim 13, wherein the server further stores and executes additional instructions to transmit, with the specbook data, the cost data or the historical data to the potential insurer via the insurer user device.

15. The system of claim 12, wherein the information about the property comprises:
a deed for the property; or
a picture of at least a portion of the property.

16. The system of claim 12, wherein the server further stores and executes additional instructions to:
receive, from the policy holder via the insuree user device, an addition to the specbook data after the insurance policy is issued;
transmit, to the insurer via the insurer user device, the addition to the specbook data;
receive, from the insurer via the insurer user device, an updated insurance policy, wherein the updated insurance policy includes updated terms or an updated premium; and
transmitting, to the policy holder via the insuree user device, the updated insurance policy.

17. The system of claim 12, wherein the server further stores and executes additional instructions to:
receive a price of a raw material associated with the specbook data;
compare the price to a valuation threshold for the raw material; and
generate an alert in response to the price meeting or exceeding the valuation threshold.

18. The system of claim 17, wherein the server further stores and executes a second set of additional instructions to:
receive an updated premium from the selected insurer in response to the alert; and
transmit the updated premium to the policy holder via the insuree user device.

* * * * *